US008431647B2

(12) United States Patent
Dumont et al.

(10) Patent No.: US 8,431,647 B2
(45) Date of Patent: Apr. 30, 2013

(54) ADHESIVE SILICONE COMPOSITIONS AND ADHESIVE BONDING/SEAMING THEREWITH

(75) Inventors: Laurent Dumont, Messimy (FR); Bertrand Bordes, Lyons (FR)

(73) Assignee: Bluestar Silicones France SAS, Lyons (FR)

( * ) Notice: Subject to any disclaimer, the term of this patent is extended or adjusted under 35 U.S.C. 154(b) by 322 days.

(21) Appl. No.: 12/788,747

(22) Filed: May 27, 2010

(65) Prior Publication Data

US 2011/0018235 A1 Jan. 27, 2011

Related U.S. Application Data

(63) Continuation of application No. 12/521,160, filed as application No. PCT/EP2007/063887 on Dec. 13, 2007, now abandoned.

(30) Foreign Application Priority Data

Dec. 27, 2006 (FR) ...................................... 06 11435

(51) Int. Cl.
  *C08L 83/04* (2006.01)
  *B32B 7/08* (2006.01)
(52) U.S. Cl.
  USPC ............................................. 524/588; 156/93
(58) Field of Classification Search .................. None
  See application file for complete search history.

(56) References Cited

U.S. PATENT DOCUMENTS

| | | | | |
|---|---|---|---|---|
| 3,791,998 A * | 2/1974 | Bruns | .......................... | 427/373 |
| 4,774,297 A * | 9/1988 | Murakami et al. | ............ | 525/478 |
| 4,861,804 A * | 8/1989 | Nakanishi | ....................... | 521/54 |
| 4,889,576 A * | 12/1989 | Suganuma et al. | ........... | 156/249 |
| 5,023,288 A * | 6/1991 | Hirai et al. | ..................... | 524/268 |
| 5,153,238 A * | 10/1992 | Bilgrien et al. | ............... | 523/211 |
| 5,198,171 A * | 3/1993 | Kasahara et al. | ......... | 264/211.23 |
| 5,248,739 A * | 9/1993 | Schmidt et al. | ............... | 525/477 |
| 5,574,073 A * | 11/1996 | Juen et al. | ...................... | 521/134 |
| 5,576,110 A * | 11/1996 | Lin et al. | ......................... | 428/447 |
| 5,623,028 A * | 4/1997 | Fitzgerald et al. | ............. | 525/474 |
| 5,763,505 A * | 6/1998 | Derian et al. | .................. | 523/322 |
| 5,763,835 A * | 6/1998 | Huynh-Ba et al. | .............. | 174/92 |
| 5,767,193 A * | 6/1998 | Fujiki et al. | .................... | 524/847 |
| 5,789,084 A * | 8/1998 | Nakamura et al. | ............. | 428/447 |
| 5,925,709 A * | 7/1999 | Takahashi et al. | ............ | 524/493 |
| 6,017,587 A * | 1/2000 | Kleyer et al. | ................. | 427/387 |
| 6,114,429 A * | 9/2000 | Yamada et al. | ............... | 524/432 |
| 6,268,300 B1 * | 7/2001 | Hernandez et al. | ........... | 442/168 |
| 6,369,184 B1 * | 4/2002 | Bohin et al. | .................... | 528/15 |
| 6,420,037 B1 * | 7/2002 | Tsuji et al. | .................... | 428/447 |
| 6,486,237 B1 * | 11/2002 | Howe et al. | ..................... | 524/71 |
| 6,562,180 B1 * | 5/2003 | Bohin et al. | .................. | 156/329 |
| 6,709,752 B1 * | 3/2004 | James et al. | ..................... | 428/447 |
| 6,989,120 B2 * | 1/2006 | Mathur et al. | ........... | 264/211.21 |
| 7,049,375 B2 * | 5/2006 | Meguriya | ....................... | 525/477 |
| 7,494,694 B2 * | 2/2009 | George et al. | ................. | 427/387 |
| 7,608,657 B2 * | 10/2009 | Mizushima et al. | .......... | 524/493 |
| 7,671,125 B2 * | 3/2010 | Heisler et al. | .................. | 524/492 |
| 2002/0129898 A1 * | 9/2002 | Takuman et al. | ............. | 156/329 |
| 2003/0144411 A1 * | 7/2003 | Howe et al. | ..................... | 524/588 |
| 2004/0236054 A1 * | 11/2004 | George et al. | ................... | 528/15 |
| 2007/0261790 A1 * | 11/2007 | Pouchelon et al. | ........... | 156/325 |

* cited by examiner

*Primary Examiner* — Robert S Loewe
(74) *Attorney, Agent, or Firm* — Dentons US LLP

(57) ABSTRACT

The present invention relates to a cross-linkable adhesive silicone composition, having a very short cross-linking time and capable of providing an adhesive having mechanical properties sufficient so that it can be used as an adhesive joint and provide waterproofing of a seam joining two substrates. Such a composition comprises: (A) at least a polyorganosiloxane (POSA) having, for each molecule, at least two alkenyl groups, preferably, C2-C6 linked to silicon; (B) at least one polyorganosiloxane cross-linking agent having, for each molecule, at least two hydrogen atoms linked to silicon; (C) a catalytically efficient amount of at least one catalyst containing at least one metallic compound, preferably platinum; (D) a reinforcing mineral filler; and is characterized in that it also comprises at least one polyorganosiloxane (POS A') gum having a weight content of alkenyl(s) group(s), preferably vinyl(s), between 0.001% and 0.2%, and having a consistency of between 300 and 1200 at 25° C.

25 Claims, No Drawings

ADHESIVE SILICONE COMPOSITIONS AND ADHESIVE BONDING/SEAMING THEREWITH

CROSS-REFERENCE TO EARLIER APPLICATIONS

This application is a continuation of U.S. patent application Ser. No. 12/521,160, filed Jun. 25, 2009, now abandoned, which is a national phase of PCT/EP 2007/063887, filed Dec. 13, 2007 and designating the United States (published in the French language on Jul. 10, 2008, as WO 2008/080791 A2; the title and abstract were also published in English), claims foreign priority under 35 U.S.C. §119 of FR 0611435, filed Dec. 27, 2006, each hereby expressly incorporated by reference in its entirety and each assigned to the assignee hereof.

The general field of the invention is that of silicone compositions that may be crosslinked by addition. The polyorganosiloxanes (POS) considered are of the cold vulcanizable type (RTV), it being known that conventionally they are in the form of a bicomponent system of which vulcanization may be accelerated by heat.

More especially within the context of the invention adhesive silicone compositions are of interest, crosslinking by an addition reaction, of which the kinetics may be significantly increased by raising the temperature.

The invention also relates to a method for adhesively bonding at least two substrates using such a crosslinkable adhesive silicone composition.

Within the context of the invention, this method applies more particularly to the production of inflatable bags used for the protection of the occupants of a vehicle, commonly called "airbags".

Traditionally, airbags are formed of a cloth made of synthetic fiber, for example of polyamide, and are produced in a single piece, or from two pieces assembled for example by adhesive bonding or by sewing by means of a polyamide thread. The outer face of the airbags produced in a single piece is generally coated with a crosslinked silicone elastomeric film forming a protective and mechanically reinforcing coating, whereas, in the case of airbags made from two parts sewn together, the silicone elastomeric film is provided on the inner face of the airbag. Assembly by sewing engenders certain disadvantages, since the pricks of the needles in the silicone elastomeric film and the cloth constitute holes in the region of the stitching, which may prejudice the leakproof properties and resistance to chemical, thermal and climatic attack. It is imperative to prevent air from escaping in the region of the sewing thread that connects the two pieces of the airbag, in particular when the airbag is used as a side airbag. Indeed, in order to protect the occupants of a vehicle that is rolling over, side airbags that cover the side windows must remain inflated for a longer time than a front or passenger airbag.

One solution for solving this problem of the leakproofness of stitching has been developed and consists of applying an adhesive joint in the region of the stitching. According to this known method, the parts of the airbag are cut out one above the other, a bead of adhesive is then deposited around one of the parts and the two parts are then compressed in order to create the joint. The bag with adhesive then passes to the "sewing" step of manufacture.

The adhesive used in this method is generally an adhesive silicone composition. Such an adhesive composition is described for example in patent EP-B-0 131 854, and makes it possible to obtain an adhesive for adhering two surfaces in a permanent manner. This composition is obtained by mixing:

(i) 9 to 70% by weight of a solid resinous copolymer, soluble in benzene, containing hydroxyl radicals, consisting essentially of $R_3SiO_{1/2}$ units and $SiO_{4/2}$ units where R is a monovalent hydrocarbon group containing less than 5 carbon atoms, at least 95% of the R groups in (i) being methyl groups, (ii) 30 to 91% by weight of a polydiorganosiloxane of formula $HO(R_2SiO)_aH$, where R is as defined above, and the mean value of a is such that the viscosity of (ii) is greater than 10,000 Pa·s at 25° C.

(iii) 0.75 to 8 parts by weight based on 100 parts by weight of (i) and (ii), of an organohydrogenopolysiloxane compatible with the mixture of (i) and (ii) and having units of formula $R_bH_cSiO_{(4-b-c)/2}$ where R is as defined above, b lies between 1.00 and less than 2, c lies between 0.3 and 1.00, the sum b+c lying between 1.30 and less than 3.00, more than 2 hydrogen atoms linked to silicon being present on average per molecule of (iii), no silicon atom bearing more than 1 hydrogen atom linked to silicon, the molar ratio of SiH units of (iii) to SiOH units of (i) and (ii) lying between 0.2/1 and 1/1, and the weight of hydrogen atoms present on the silicon being less than 0.05 g per 100 g of (i) and (ii), (iv) 0.5 to 2 parts by weight, based on 100 parts by weight of (i) and (ii) of a tin-based soluble catalyst, and (v) a sufficient quantity of non-reactive solvent for mixing (i), (ii), (iii) and (iv), in order to obtain an adhesive capable of flowing of which the viscosity and solid content are jointly such that a single application of the adhesive makes it possible to achieve an adhesive thickness of at least 0.1 mm.

The method described for applying this composition specifies a step of evaporating solvent, which increases the manufacturing time for a part and reduces production output.

Moreover, the performances of this adhesive remain modest, in all cases not sufficient for this adhesive to be used in the field of the assembly of airbags.

Now, in the special case of airbags, adhesives must be used having sufficient adhesive strength and a high stress at break and a degree of elongation. Indeed, when the airbag opens, the fabric inflates very rapidly and deformation of the fabric in the region of the stitching is very high. This is particularly observed in side airbags, for which, contrary to the front and passenger airbags, the fabric in the region of the stitching is not folded inwards but outwards, due to the complex form of the bag.

Other formulations have been developed in order to improve the mechanical properties of the adhesives. Notably, patent EP-B-1 225 211 describes an adhesive silicone composition that comprises:

A. 100 parts by weight of an organopolysiloxane having an average of at least two alkenyl groups per molecule;

B. an organopolysiloxane having an average of at least two hydrogen atoms linked to a silicon atom in each molecule in an amount such that the molar ratio of hydrogen atoms linked to a silicon atom in the compound B to the alkenyl groups in the component A is 0.01 to 20;

C. between 5 and 200 parts by weight of a calcium carbonate powder chosen from the group comprising untreated calcium carbonate, calcium carbonate treated with an organic acid, calcium carbonate treated with an ester of an organic acid, said calcium carbonate powder having a BET specific surface area of between 5 and 50 $m^2/g$; and D. a platinum-based catalyst in a sufficient quantity to obtain setting of the composition.

This composition makes it possible to obtain an adhesive having a tensile strength of 3.5 MPa (JISK6251 test) and an elongation at break of 1500%. However, it is indicated that this composition is allowed to harden for 7 days at 25° C. in order to obtain the adhesive having the desired properties in elongation and tensile strength. It is quite obvious that it is not possible in industrial production to consider such a crosslinking time.

A method for adhesively bonding fibrous substrates, whether woven or not, is also known from publication WO 2004/101696, in the name of the Applicant, comprising at least one silicone coating, this method being of the type consisting of overlapping the substrates to be adhesively bonded, a silicone-based adhesive being inserted between the substrates, on at least part of the overlapping zone; characterized in that it consists essentially of:

employing at least one crosslinkable silicone adhesive of the "Liquid Silicone Rubbers" class (LSR) or of the Pumpable Silicone Elastomers (PSE) class, being in liquid form (fluid paste) at ambient temperature and having the following rheological characteristics:
  upper fluidity limit:
  Brookfield viscosity at 25° C. in Pa·s:
    $\eta \geq 100$, preferably $\eta \geq 200$
  lower fluidity limit:
    extrusion rate Ve in $g \cdot min^{-1}$ measured by the Te test
    $Ve \leq 20$, preferably $Ve \leq 50$;

putting this liquid adhesive directly in form and in place on at least one of the substrates to be adhesively bonded, in their overlapping zone;

holding the substrates with applied adhesive in intimate contact in their overlapping zone, so as to prevent any air being trapped at the interface;

and of heating the adhesive in place between the substrates thus held in intimate contact, so as to enable the substrates to be adhesively bonded by crosslinking of the adhesive.

Preferably, the silicone adhesive selected has the following composition:

(a) at least one polyorganosiloxane (POS) having, per molecule, at least two alkenyl groups, preferably with $C_2$-$C_6$ linked to silicon;
(b) a reinforcing mineral filler;
(c) a catalytically effective quantity of a least one catalyst:
  based on at least one organic peroxide in the case where the composition is free from crosslinking agent (POS) (e) defined hereinafter;
  or based on at least one metallic compound, preferably of platinum, and advantageously associated with a setting regulator, in the case where the composition includes at least one POS crosslinking agent (e) defined hereinafter;
(d) optionally a complementary filler;
(e) optionally at least one polyorganosiloxane crosslinking agent having, per molecule, at least three hydrogen atoms linked to silicon;
(f) optionally at least one polyorganosiloxane additive of which at least 50 number % of silicon atoms are each linked to at least one hydrogen atom;
(g) optionally at least one adhesion promoter;
(h) optionally at least one polyorganosiloxane resin;
(i) and optionally functional additives for conferring specific properties.

Examples relating to LSRs show that it is necessary to heat them for 3 minutes at 180° C. in order to obtain a peel strength of 40 N/cm.

The mechanical properties, in terms of the adhesive strength of these adhesives, are acceptable, notably for producing adhesive joints in the region of the airbag stitching. However, the crosslinking times are still too long and the elongation properties and tensile strength are not sufficient for this particular application.

In order to increase production rates, an adhesive composition is therefore sought that hardens very rapidly, it being possible to accelerate crosslinking by heating while retaining the mechanical properties at least equivalent to those of adhesives already used in the field of airbags. More precisely, it is necessary to provide an adhesive composition that will be applied in the region of the stitching in order to give an adhesive joint that will sufficiently adhere the two parts of a bag already coated with a silicone elastomer film that will prevent air from escaping, that will be resistant to ageing, and that will remain continuous from one part of the bag to the other during sudden inflation of the bag. In particular, when the bag inflates, the adhesive joint must resist the very high extension between the two parts of the bag while continuing to cover the threads of the stitching in order to preserve leakproofness. It appears that it is necessary to have available an adhesive that is capable of dissipating the maximum amount of energy. Indeed, the more the adhesive will absorb energy, the more the airbag will resist pressure during and after it opens. In the present description, the energy dissipated is defined as being the area under the tensile curve representing stress as a function of deformation.

Taking into account the prior art, one of the essential objectives of the present invention is to provide a rapidly crosslinkable adhesive silicone composition in order to be able to accelerate production rates of the product to be adhesively bonded.

Another essential objective of the present invention is to provide a novel adhesive silicone composition, applied notably on a silicone-treated coating, and making it possible to obtain an adhesive having a sufficient peel strength, for example greater than or equal to 30 N/cm.

Another essential objective of the present invention is to provide an adhesive silicone composition making it possible to absorb a maximum amount of energy when the adhesively bonded product is subjected to stresses.

Another essential objective of the present invention is to provide an adhesive silicone composition or a use thereof for adhesively bonding two substrates, these substrates being notably two parts assembled by sewing, constituting an inflatable bag for the protection of an occupant of a vehicle.

Another essential objective of the present invention is to recommend the use of such a crosslinkable silicone composition as a leakproof joint for the stitching of two substrates assembled by sewing.

Another essential objective of the present invention is to provide a method for adhesively bonding at least two substrates with the aid of a crosslinkable silicone composition, said method making it possible to obtain, easily and economically, a solid durable assembly between the two substrates.

These objectives, among others, are achieved by the present invention that first of all relates to a crosslinkable adhesive composition comprising:

(A) at least one polyorganosiloxane (POS A) having, per molecule, at least two alkenyl groups, preferably with $C_2$-$C_6$ linked to silicon;
(B) at least one polyorganosiloxane crosslinking agent having, per molecule, at least two hydrogen atoms linked to silicon;
(C) a catalytically effective quantity of a least one catalyst based on at least one metallic compound, preferably of platinum;
(D) a reinforcing filler;
(E) optionally a complementary filler;
(F) optionally a crosslinking inhibitor;
(H) optionally at least one polyorganosiloxane resin;

(I) and optionally functional additives for conferring specific properties,
characterized in that it also includes at least one polyorganosiloxane gum POS (A') different from POS (A), having a content by weight of an alkenyl group or groups, preferably with $C_2$-$C_6$ linked to silicon, and even more preferably of a vinyl group or groups of between 0.001 and 0.2%, preferably between 0.01% and 0.1%, and having, at 25° C., a consistency of between 300 and 1200, preferably between 500 and 1000, and even more preferably between 600 and 900.

The adhesive composition according to the invention is advantageous in that it enables very short crosslinking times to be obtained at ambient temperature or by heating without harming the mechanical properties of the adhesive obtained. In particular, the adhesive composition according to the invention crosslinks in approximately 3 hours at 25° C., or preferably by heating at 190° C. in a time less then 5 minutes, even more preferably by heating at 80° C. in 90 seconds. Moreover, the adhesive obtained has tensile values at break and elongation at break such that the energy absorbed by the adhesive obtained with the composition according to the invention is greater than the energy absorbed by adhesives existing on the market.

In the present description, reference is made to the following "silicone" nomenclature for representing siloxy ("*Chemistry and technology of silicones*" Walter Noll Academic Press 1968 Table 1 page 3"):

M: $(R°)_3SiO_{1/2}$
$M^{Alc}$: $(R°)_2(Alc)SiO_{1/2}$
D: $(R°)_2SiO_{2/2}$
$D^{Alc}$: $(R°)(Alc)SiO_{2/2}$
M': $(R°)_2(H)SiO_{1/2}$
D': $(R°)(H)SiO_{2/2}$
$M^{OH}$: $(R°)_2(OH)SiO_{1/2}$
$D^{OH}$: $(R°)(OH)SiO_{2/2}$
T: $(R°)SiO_{3/2}$
Q: $SiO_{4/2}$.

Where R° is chosen from linear or branched alkyl groups having 1 to 8 carbon atoms inclusively (e.g. methyl, ethyl, isopropyl, tertiobutyl and n-hexyl), possibly substituted with at least one halogen atom (e.g. trifluoro-3,3,3 propyl), and as well as from aryl groups (e.g. phenyl, xylyl and tolyl),
Alc=alkenyl, preferably vinyl (noted Vi), or allyl.

The main POS of the adhesive composition, namely the polyorganosiloxane (A) advantageously has units of formula:

$$W_aZ_bSiO_{(4-(a+b))/2} \quad (A.1)$$

in which:
W is an alkenyl group, preferably vinyl,
Z is a monovalent hydrocarbon group, free from an unfavorable action on the activity of the catalyst and chosen from alkyl groups having 1 to 8 carbon atoms inclusively, possibly substituted with at least one halogen atom, as well as from aryl groups,
a is 1 or 2, b is 0, 1 or 2 and a+b is between 1 and 3;
and optionally other units with the average formula:

$$Z_cSiO_{(4-c)/2} \quad (A.2)$$

in which Z has the same meaning as above and c has a value of between 0 and 3.

The Z groups may be identical of different.

"Alkenyl" is understood to mean an unsaturated, linear or branched hydrocarbon chain, substituted or not, having at least one olefinic double bond, and more preferably a single double bond. Preferably, the "alkenyl" group has 2 to 8 carbon atoms and better still 2 to 6. This hydrocarbon chain optionally includes at least one heteroatom such as O, N, S.

Preferred examples of "alkenyl" groups are vinyl, allyl and homoallyl groups, vinyl being particularly preferred.

"Alkyl" denotes a saturated, linear or branched hydrocarbon chain, possibly substituted (e.g. with one or more alkyls), with preferably 1 to 10 carbon atoms, for example 1 to 8 carbon atoms and better still 1 to 4 carbon atoms.

Examples of alkyl groups are notably methyl, ethyl, isopropyl, n-propyl, tert-butyl, isobutyl, n-butyl, n-pentyl, isoamyl and 1,1-dimethylpropyl.

The expression "aryl" denotes an aromatic hydrocarbon group having 6 to 18 carbon atoms that is monocyclic or polycyclic and preferably monocyclic or bicyclic. It should be understood that, within the context of the invention, a polycyclic aromatic radical is understood to mean a radical having one or more aromatic nuclei, condensed (orthocondensed or ortho and pericondensed) to each other, namely having, in pairs, at least two carbon atoms in common.

As an example of "aryl", mention may be made of phenyl, xylyl and tolyl radicals.

Advantageously, the POS (A) has a viscosity at least equal to 10 mPa·s, preferably equal to 1000 mPa·s and even more preferably between 5,000 and 200,000 mPa·s.

In the present description, the viscosities indicated correspond to a magnitude of dynamic viscosity measured at 25° C. with the aid of a Brookfield viscometer, according to standard AFNOR NFT 76 102 of February 1972.

The POS (A) may of course be a mixture of several oils corresponding to the same definition as POS (A).

POS (A) may be solely formed of units of formula (A.1) or may additionally contain units of formula (A.2).

POS (A) is advantageously a linear polymer of which the diorganosiloxane chain consists essentially of siloxy units D or $D^{Vi}$, and is blocked at each end by a siloxy unit M or $M^{Vi}$.

Preferably, at least 60% of the Z groups represent methyl radicals. The presence, along the diorganopolysiloxane chain, of small quantities of units other than $Z_2SiO$, for example units of formula $ZSiO_{1.5}$ (siloxy units T) and/or $SiO_2$ (siloxy units Q) is not however excluded in a proportion of at most 2% (these percentages expressing the number of T and/or Q units per 100 silicon atoms).

Examples of siloxyl units of formula (A.1) are vinyldimethylsiloxyl, vinylphenylmethylsiloxyl and vinylsiloxyl units.

Examples of siloxyl units of formula (A.2) are $SiO_{4/2}$, dimethylsiloxyl, methylphenylsiloxyl, diphenylsiloxyl, methylsiloxyl and phenylsiloxyl units.

Examples of POS (A) are dimethylpolysiloxanes with dimethylvinylsilyl endings, methylvinyldimethylpolysiloxane copolymers with trimethylsilyl endings, methylvinyldimethylpolysiloxanes copolymers with dimethylvinylsilyl endings and cyclic methylvinylpolysiloxanes.

These POS(A) oils are marketed by silicone manufacturers or may be manufactured by operating with already known techniques.

The polyorganosiloxane crosslinking agent (B) is preferably of the type of those bearing the siloxyl unit of formula:

$$H_dL_eSiO_{(4-(d+e)/2} \quad (B.1)$$

in which:
L is a monovalent hydrocarbon group, free from an unfavorable action on the activity of the catalyst and chosen from alkyl groups having 1 to 8 carbon atoms inclusively, possibly substituted with at least one halogen atom, as well as from aryl groups,
d is 1 or 2, e is 0, 1 or 2 and d+e has a value between 1 and 3;

and optionally other units with the average formula:

$$L_g SiO_{(4-g)/2} \quad (B.2)$$

in which L has the same meaning as above and g has a value of between 0 and 3.

The dynamic viscosity of this polyorganosiloxane (B) is at least equal to 5 mPa·s and preferably lies between 20 and 1000 mPa·s.

The polyorganosiloxane (B) may be solely formed of units of formula (B.1) or additionally carry units of formula (B.2).

The polyorganosiloxane (B) may have a cyclic branched linear structure or one in a network.

The group L has the same meaning as the group Z above.

Examples of siloxyl units of formula (B.1) are:
$H(CH_3)_2SiO_{1/2}$, $HCH_3SiO_{2/2}$, $H(C_6H_5)SiO_{2/2}$ Examples of siloxyl units of formula (B.2) are the same as those indicated above for the examples of siloxyl units of formula (A.2).

Examples of polyorganosiloxanes (B) are linear and cyclic compounds such as:
- dimethylpolysiloxanes with hydrogenodimethylsilyl endings,
- copolymers with (dimethyl)-(hydrogenomethyl)-polysiloxane units with trimethylsilyl endings,
- copolymers with (dimethyl)-(hydrogenomethyl)-polysiloxane units with hydrogenodimethylsilyl endings,
- hydrogenomethylpolysiloxanes with trimethylsilyl endings,
- cyclic hydrogenomethylpolysiloxanes.

In a particularly advantageous manner, the polyorganosiloxane crosslinking agent (B) consists of a mixture of a polyorganosiloxane crosslinking agent (Bi) of which the organopolysiloxane chain consists essentially of $L_d SiO_{(4-g)/2}$ units, g lying between 0 and 2, and is blocked at each end by an $H_d L_e SiO_{(4-(d+e))/2}$ unit where d+e is equal to 3 and of a polyorganosiloxane crosslinking agent (Bii) of which the polyorganosiloxane chain includes $L_g SiO_{(4-g)/2}$ units, g lying between 0 and 2 and $H_d L_e SiO_{(4-(d+e))/2}$ units where d+e is equal to 1 or 2, and is blocked at each end by an $H_d L_e SiO_{(4-(d+e))2}$ unit where d+e is equal to 3.

Preferably, quantities of POS(Bi) and POS(Bii) are such that the weight ratio POS(Bi):POS(Bii) lies between 1 and 3.

Preferably, the POS (Bi) crosslinking agent is a dimethylpolysiloxane with hydrogenodimethylsilyl endings and the POS (Bii) crosslinking agent is a (dimethyl)(hydrogenomethyl)polysiloxane copolymer with hydrogenodimethylsilyl endings.

The ratio of the number of hydrogen atoms linked to silicon in the polyorganosiloxane crosslinking agent (B) to the total number of groups with an alkenyl unsaturation of the polyorganosiloxane (A) and of the gum (A') lies between 0.4 and 10, preferably between 0.8 and 3, and even more preferably equal to 0.8 and moreover less than 1.

According to the invention, the composition includes, apart from POS (A), a gum (A') that is useful in the present invention and is preferably a polyorganosiloxane gum having a consistency of between 300 and 1200, preferably between 500 and 1000, and even more preferably between 600 and 900. Determination of the consistency at 25° C. may be carried out by measuring penetrability with the aid of a penetrometer according to standards AFNOR NFT 60 119, NFT 60 123, NFT 66 004, ASTM D 217, D 937, D 1321 and D5.

In a general manner, the POS(A') is defined in the same manner as POS(A) and advantageously has units of formula:

$$W_a Z_b SiO_{(4-(a+b))/2} \quad (A.1)$$

And possibly other units of average formula:

$$Z_c SiO_{(4-c)/2} \quad (A.2)$$

in which W, Z, a, b and c have the same definitions as above.

Preferably, the polyorganosiloxane chain of the gum (A') essentially bears units of formula A1 in which a+b is equal to 2 and/or units of formula A2 in which c is equal to 2.

Preferably, the organopolysiloxane chain of the gum (A') essentially contains siloxy units D and/or $D^{Alc}$, $R°$ as defined above being preferably a methyl or phenyl group, and Alc being preferably a vinyl or allyl group. Thus, the gum according to the invention may for example contain essentially dimethylsiloxy, methylphenylsiloxy, diphenylsiloxy, methylvinylsiloxy, methylallylsiloxy and phenylvinylsiloxy units. The presence, along the diorganopolysiloxane chain, of small quantities of siloxy units T and/or $SiO_2$ units (siloxy units Q) is not however excluded in a proportion of at most 2% (these percentages expressing the number T and/or Q units per 100 atoms of silicon).

Preferably, the polyorganosiloxane chain of the gum is blocked at each end by M or $M^{Vi}$ siloxy units.

According to a preferred embodiment, the alkenyl group or groups of the gum are distributed randomly on the organopolysiloxane chain of said gum with the exception of the ends. For example, the gum used in the invention has the structure $MDD^{Vi}M$.

According to another variant, the alkenyl group or groups of the gum is/are disposed solely at the ends of the organopolysiloxane chain of said gum. For example, the gum used in the invention has the structure $M^{Vi}DM^{Vi}$.

It is obvious that these various types of gum may be combined.

The gum used in the invention may be present in an amount of 5 to 20% by weight, preferably 5 to 10% by weight, based on all the constituents.

The polyaddition reaction appropriate for the crosslinking mechanism of the adhesive composition according to the invention is well known to a person skilled art. It is also possible to use a catalyst (C) in this reaction. This catalyst (C) may notably be chosen from compounds of platinum and rhodium. It is possible, in particular, to use platinum complexes and an organic product described in U.S. Pat. No. 3,159,601, U.S. Pat. No. 3,159,602, U.S. Pat. No. 3,220,972 and European patents EP-A-0 057 459, EP-A-0 118 978 and EP-A-0 190 530, complexes of platinum and vinylorganosiloxanes described in U.S. Pat. No. 3,419,593, U.S. Pat. No. 3,715,334, U.S. Pat. No. 3,377,432 and U.S. Pat. No. 3,814,730. The catalyst generally preferred is platinum. In this case, the quantity of weight of catalyst (C), calculated as the weight of metallic platinum, generally lies between 2 and 400 ppm, preferably between 5 and 100 ppm, based on the total weight of the POSs (A) and (B).

The reinforcing mineral filler (D) is selected from silicas and/or aluminas, preferably from silicas.

As silicas that may be used, fillers are envisaged characterized by a fine particle size often less than or equal to 0.1 µm and a high ratio of specific surface area to weight, generally lying within the range of approximately 50 square meters per gram to more than 300 square meters per gram. Silicas of this type are commercially available products and are well known in the art of the manufacture of adhesive silicone compositions. These silicas may be colloidal silicas, silicas prepared pyrogenically (silicas called combustion or fumed silicas) or by wet methods (precipitated silicas) of mixtures of these silicas.

The chemical nature and the method for preparing silicas capable of forming the filler (D) are not important for the purpose of the present invention, provided the silica is capable of exerting a reinforcing action on the final adhesive. Cuts of various silicas may of course also be used.

These silica powders have a mean particle size generally close to or equal to 0.1 μm and a BET specific surface area greater than 50 m²/g, preferably between 50 and 400 m²/g, notable between 150 and 350 m²/g.

These silicas are optionally:
pretreated with the aid of at least one compatibilizing agent chosen from the group of molecules that satisfy at least two criteria:
have a high interaction with silica in the region of its hydrogen bonds with itself and with the surrounding silicone oil;
are themselves, or their degradation products, easily removed from the final mixture by heating under vacuum in a gas flow, and compounds of low molecular weight are preferred;
and/or treated in situ:
in a specific manner with the aid of at least one untreated silica,
and/or in a complementary manner by using at least one compatibilization agent of nature similar to that which can be used in pre-treatment and as defined above.

In situ treatment of the silica filler is understood to mean putting the filler and the compatibilizing agent in the presence of at least one portion of the preponderant silicone polymer POS(A) referred to above.

The compatibilizing agent is chosen according to the treatment method (pre-treatment or in situ) and may for example be selected from the group comprising:
chlorosilanes,
polyorganocyclosiloxanes, such as octamethylcyclosiloxane (D4).
silazanes, preferably disilazanes, or mixtures thereof, hexamethyldisalazane (HMDZ) being the preferred silazane and that may be associated with divinyltetramethyl-disilazane,
polyorganosiloxanes having, per molecule, one or more hydroxyl groups linked to silicon,
amines such as ammonia or alkylamines with a low molecular weight such as diethylamine,
organic acids with a low molecular weight such as formic or acetic acids,
and mixtures thereof.

In the case of in situ treatment, the compatibilizing agent is preferably used in the presence of water.

For more details in this respect, reference may be made for example to patent FR-B-2 764 894.

As a variant, it is possible to use compatibilizing methods of the prior art providing early treatment by silazane (e.g. FR-A-2 320 324) or a delayed treatment (e.g. EP-A-462 032) bearing in mind that according to the silica used their use will in general not make it possible to obtain the best results in terms of mechanical properties, in particular extensibility, obtained by treatment on two occasions according to the invention.

As a reinforcing alumina that may be used as the filler (D), a highly dispersible alumina is advantageously employed, doped or not in a known manner. It is of course possible also to use cuts of various aluminas. As a non-limiting examples of such aluminas, reference may be made to aluminas A 125, CR 125, D 65CR from the Baïkowski Company. Preferably, the reinforcing filler used is a combustion silica, taken alone or mixed with alumina.

As regards weight, it is preferred to employ a quantity of reinforcing filler (D) of between 5 and 30, preferably between 7 and 20% by weight based on all the constituents of the composition.

The use of a complementary filler (E) preferably non-reinforcing, may be envisaged according to the invention.

Among the non-reinforcing complementary fillers (D), mention made be made notably to those selected from the group comprising colloidal silicas, combustion and precipitated silica powders, diatomaceous earths, ground quartz, carbon black, titanium dioxide, aluminum oxide, hydrated alumina, expanded vermiculite, zirconia, zirconate, non-expanded vermiculite, calcium carbonate, zinc oxide, mica, talc, iron oxide, barium sulfate and slaked lime or mixtures thereof.

These complementary fillers (E) have a particle size generally between 0.1 and 300 μm and a BET surface area less than 100 m²/g.

The crosslinking inhibitors (F) are also well known. They are conventionally chosen from the following compounds:
polyorganosiloxanes, advantageously cyclic and substituted by at least one alkenyl group, tetramethylvinyltetrasiloxane being particularly preferred,
pyridine,
phosphine and organic phosphites,
unsaturated amides,
alkylated maleates,
acetylenic alcohols.

These acetylenic alcohols (cf. FR-B-1 528 464 and FR-A-2 372 874), which form part of the preferred thermal blockers of the hydrosilylation reaction, have the formula:

the formula in which:
R is a linear or branched alkyl radical, or a phenyl radical;
R' is H or a linear or branched alkyl radical, or a phenyl radical;
the radicals R, R' and the carbon atom situated in the alpha position of the triple bond being possibly able to form a ring;
the total number of carbon atoms contained in R and R' being at least 5, preferably 9 to 20.

Said alcohols are preferably chosen from those having a boiling point above 250° C. As examples, mention may be made of:
ethynyl-1-cyclohexanol 1;
methyl-3 dodecyne-1 ol-3;
trimethyl-3,7,11 dodecyne-1 ol-3;
diphenyl-1,1 propyne-2 ol-1
ethyl-3 ethyl-6 nonyne ol-3;
methyl-3 pentadecyne-1 ol-3.

These alpha-acetylenic alcohols are commercial products.

Such a regulator is present at a rate of a maximum of 2,000 ppm, preferably at a rate of 20 to 50 ppm based on the total weight of organopolysiloxanes (A) and (B).

According to a variant, the silicone phase of the composition may include at least one polyorganosiloxane resin (H), possibly bearing at least one alkenyl residue in its structure, and this resin has a content by weight in an alkenyl group or groups of between 0.1 and 20% by weight and, preferably, between 0.2 and 10% by weight.

These resins are branched organopolysiloxanes that are well known and commercially available. They preferably are in the form of siloxane solutions. They include, in their structure, at least two different units chosen from M, D, T and Q units, at least one of these units being a T or Q unit.

Preferably, these resins are alkenylated (vinylated). As examples of branched organopolysiloxane oligomers or polymers, mention may be made of MQ resins, MDQ resins, TD resins and MDT resins, it being possible for the alkenyl units to be carried by the M, D and/or T units. As examples of resins that are particularly well suited, mention may be made of vinylated MDQ or MQ resins having a gravimetric content of vinyl groups of between 0.2 and 10% by weight, these vinyl groups being carried by the M and/or D units.

In a known manner, the adhesive composition according to the invention may have various functional additives (I) added to it, normally used in the field of the invention.

For storage reasons, the varnish composition is advantageously provided in the form of an at least bicomponent system, of which the mixture is capable of rapidly crosslinking when heated by polyaddition. The ingredients are then distributed in various parts according to the rules of a person skilled in the art. In particular, the catalyst is separated from the component that contains the hydrogenosiloxanes.

The present invention also relates to a method for adhesively bonding at least two substrates S1 and S2, characterized in that it consists essentially:
of preparing an adhesive composition as described above;
of applying this composition to at least one of the surfaces of S1 and/or S2 to be adhesively bonded;
of assembling the adhesive-coated surfaces together;
optionally of exerting pressure on the adhesive-coated surfaces;
and preferably of heating the assembly.

The heating temperature is preferably below 190° C. for a heating time less than 5 minutes, preferably 3 minutes, and preferably 180° C. for a heating time of 60 seconds, and even more preferably 80° C. for a heating time of 90 seconds.

The substrates S1 and S2 to be assembled are preferably flexible, and may be chosen from the group comprising textiles, non-woven fibrous substrates, polymer films, in particular polyester, polyamide, polyolefin, polyurethane and silicone polyvinyl chloride. The substrates S1 and S2 may also be made of glass.

According to a variant, at least one of the surfaces of S1 and/or S2 includes silicone, preferably an elastomeric silicone, this silicone advantageously forming a coating for said substrate. The adhesive composition is then applied to the silicone. Such elastomeric silicone compositions are well known to a person skilled in the art and do not require a detailed description.

The adhesive composition according to the invention is applied so as to obtain an adhesive having a thickness of at least 0.5 mm.

The field of application of the recommended use of the invention is advantageously that of the assembly of inflatable bags for the protection of the occupant of a vehicle that are to be assembled by adhesive bonding and sewing, the substrates S1 and S2 then being the two parts constituting the bag, the composition according to the invention being applied on at least one of the surfaces of S1 and/or S2 in the region of the stitching.

When the adhesive composition according to the invention is crosslinked by heating, the heating step for said composition is preferably carried out before sewing the substrates S1 and S2.

The present invention also concerns the use of a composition as described above as an adhesive and/or as a leakproof joint for the stitching of the two substrates S1 and S2 assembled by sewing.

The present invention also concerns an inflatable bag for protecting an occupant of a vehicle, consisting of two parts sewn together, adhesively bonded and/or made leakproof in the region of the stitching by a composition as described above.

The following examples describe the preparation of the crosslinkable adhesive silicone composition according to the invention. These examples will make it possible to understand the invention better and to reveal its advantages compared with compositions of the prior art.

EXAMPLES

Example 1

Invention

First of all, 30 parts by weight of a polydimethylsiloxane blocked at each end by dimethylvinylsiloxy units, having a viscosity of 20,000 mPa·s, were mixed with 13 parts by weight of pyrogenic silica having a BET specific surface area of 300 m²/g, treated with 3.8 parts by weight of a hexamethyldisilazane mixture associated with divinyltetramethyldisilane, and 1 part by weight of water.

10 parts by weight were then added of an MDD$^{Vi}$M silicone copolymer gum that had 720 ppm by weight of vinyl groups distributed randomly along the silicone chain, with a consistency of between 600 and 900, 28 parts by weight of a polydimethylsiloxane blocked at each end with dimethylvinylsiloxy units, having a viscosity of 100,000 mPa·s, 13 parts by weight of precipitated calcium carbonate, with a mean particle size of the order of 1.9 μm, 1.1 parts by weight of a dimethylpolysiloxane crosslinking agent (bi) with hydrogenodimethylsilyl endings, with a viscosity of 9 mPa·s, 0.6 parts by weight of a (dimethyl)(hydrogenomethyl)polysiloxane copolymer crosslinking agent (bii) with hydrogenodimethylsilyl endings, with a viscosity of 275 mPa·s and containing 4.7% of SiH, 0.025 parts by weight of ethynyl-1-cyclohexanol 1 and 0.025 parts by weight of a catalyst called a Karstedt complex having 10% by weight of platinum as metallic platinum. The ratio of the number of hydrogen atoms linked to silicon in the polyorganosiloxane crosslinking agent (B) to the total number of groups with alkenyl unsaturation of the polyorganosiloxane (A) and of the gum (A') was equal to 0.87, the ratio of the number of hydrogen atoms linked to silicon in the polyorganosiloxane crosslinking agent (Bi) to the total number of groups with an alkenyl unsaturation of the polyorganosiloxane (A) of the gum (A') was equal to 0.61 and the ratio of the number of hydrogen atoms linked to silicon in the polyorganosiloxane crosslinking agent (Bii) to the total number of groups with an alkenyl unsaturation of the polyorganosiloxane (A) and of the gum (A') was equal to 0.26.

The viscosity of the mixture was 575,000 mPa·s.

Example 2

Comparative

As a comparison, an adhesive composition similar to example 1 was prepared but without using gum and replacing the gum by polydimethylsiloxane blocked at both ends with dimethylvinylsiloxy units, having a viscosity of 100,000 mPa·s.

Characterization of the Adhesive
a) Dynamometric Properties

After the adhesive compositions had been degassed, they were used for preparing specimens necessary for measuring the dynamometric properties. For this, specimen sheets, 2 mm thick, were prepared from adhesive molded in a press at 3 bar at 150° C. and crosslinked under these conditions in 15 minutes. After crosslinking, the specimens were left standing under laboratory conditions (25° C., 50% RH) for 16 hours before being tested. The tensile strength and moduli at 100%, 200% and 300% were measured as well as the elongation at break according to the method described in standard ASTM D412.

The hardness (Shore A) was also measured according to standard ASTM D2240.

b) Adhesive Strength

The adhesive strength was evaluated by a peel test. For this, the adhesive compositions were applied between two textile substrates of the polyamide type of which a coating of RTV II was applied at a rate of 30 g/m². The composition of the RTV II used was Rhodorsil® TCS 7534 marketed by Rhodia Silicones. The adhesive compositions were applied by means of a Mathis coater adjusted so as to obtain an adhesive thickness of 0.5 mm. Crosslinking was carried out by holding in a ventilated oven at a temperature of 190° C. for 5 minutes. After crosslinking, the substrates were allowed to stand under laboratory conditions (25° C., 50% RH) for 16 hours, before being tested. The adhesive force was measured according to the peel test method in standard JISK 6854. The type of break obtained was also noted as a percentage, whether adhesive or cohesive A/C.

The energy was calculated by calculating the area under the tensile curve representing stress as a function of deformation.

The various compositions were subjected to the tests described above in order to characterize the adhesive obtained. The results are given in Table I below:

| Mechanical properties | Ex. 1 (inv.) | Ex. 2 (comp.) |
|---|---|---|
| Tensile strength (MPa) | 5 | 3 |
| Elongation at break (%) | 1180 | 1005 |
| 100% modulus (MPa) | 0.25 | 0.1 |
| 200% modulus (MPa) | 0.4 | 0.3 |
| 300% modulus (MPa) | 0.6 | 0.5 |
| Shore A hardness | 15 | 12 |
| Peel strength (N/cm) | 34 | |
| Break A/C | 0/100 | |
| Energy (MPa) | 2430 | 1346 |

The results of table I show that the adhesive composition according to the invention, containing a vinylated gum, made it possible to obtain an adhesive that had mechanical properties, in particular absorbed energy, better than the adhesive not containing gum.

Crosslinking Parameters

The peel test as described above was reproduced with the adhesive composition according to Example 1 but while varying the crosslinking time and temperature.

TABLE II

| Temperature | 190° C. | 190° C. | 180° C. | 160° C. | 120° C. | 80° C. | 25° C. |
|---|---|---|---|---|---|---|---|
| Time | 5 min | 1 min | 90 s | 90 s | 90 s | 90 s | 3 h |
| Peel strength (N/cm) | 34 | 30 | 35 | 32 | 31 | 36 | 15 |
| Break A/C | 0/100 | 0/100 | 0/100 | 10/90 | 10/90 | 30/70 | 100/0 |

The results of table II show that the crosslinking time for adhesive compositions according to the invention is very short, even at low temperatures. The composition according to the invention hardens at ambient temperature (25° C.) in 3 hours. It will be recalled that comparatively, the composition described in patent EP-B-1 225 211 is allowed to harden for 7 days at 250° C. Moreover, if it is desired to accelerate crosslinking by heating, a very small amount of energy is sufficient to crosslink the composition in a very short time: 90 seconds at 80° C. are sufficient to obtain an adhesive having all the required mechanical properties and with an essentially cohesive break.

The invention claimed is:

1. A crosslinkable silicone composition comprising:
   (A) at least one polyorganosiloxane (POS A) having, per molecule, at least two alkenyl groups,
   (A') at least one polyorganosiloxane gum POS (A') having a content by weight of an alkenyl group or groups of between 0.001 and 0.2%, and having a consistency of between 300 and 1200 at 25° C.,
   (B) at least one polyorganosiloxane crosslinking agent having, per molecule, at least two hydrogen atoms linked to silicon;
   (C) a catalytically effective quantity of a least one catalyst based on at least one metallic compound;
   (D) a reinforcing filler;
   (E) optionally a complementary filler;
   (F) optionally a crosslinking inhibitor;
   (H) optionally at least one polyorganosiloxane resin; and
   (I) optionally functional additives for conferring specific properties,
   said composition upon crosslinking being an adhesive having a peel strength of at least 15 N/cm as measured by using standard JIS K 6854.

2. The composition of claim 1, wherein the POSs (A) and (A') have units of formula:

$$W_a Z_b SiO_{(4-(a+b))/2} \quad (A.1)$$

in which:
   W is an alkenyl group
   Z is a monovalent hydrocarbon group, free from an unfavorable action on the activity of the catalyst and is selected from aryl groups and alkyl groups having 1 to 8 carbon atoms inclusively, optionally substituted with at least one halogen atom,
   a is 1 or 2,
   b is 0, 1 or 2 and
   a+b is 1-3;
and optionally other units with the average formula:

$$Z_c SiO_{(4-c)/2} \quad (A.2)$$

in which Z has the same meaning as above and c has a value of 0-3.

3. The composition of claim 2, wherein the organopolysiloxane chain of the gum POS(A') essentially bears units of formula A1 in which a+b is equal to 2 and/or units of formula A2 in which c is equal to 2.

4. The composition of claim 2, where W is a vinyl group.

5. The composition of claim 1, wherein the polyorganosiloxane crosslinking agent (B) bears siloxyl units of formula:

$$H_d L_e SiO_{(4-(d+e)/2} \quad (B.1)$$

in which:
L is a monovalent hydrocarbon group, free from an unfavorable action on the activity of the catalyst and is selected from aryl groups and alkyl groups having 1 to 8 carbon atoms inclusively, optionally substituted with at least one halogen atom,
d is 1 or 2,
e is 0, 1 or 2 and
d+e is 1-3;
and optionally other units with the average formula:

$$L_g SiO_{(4-g)/2} \tag{B.2}$$

in which L has the same meaning as above and g is 0-3.

6. The composition of claim 5, wherein the polyorganosiloxane (B) consists of a mixture of a polyorganosiloxane crosslinking agent (Bi) of which the organopolysiloxane chain consists essentially of $L_g SiO_{(4-g)/2}$ units, where g is 0-2, and is blocked at each end by a $H_d L_e SiO_{(4-(d+e))/2}$ unit, where d+e is equal to 3, and of a polyorganosiloxane crosslinking agent (Bii) of which the polyorganosiloxane chain includes $L_g SiO_{(4-g)/2}$ units, where g is 0-2 and $H_d L_e SiO_{(4-(d+e))/2}$ units, where d+e is equal to 1 or 2, and is blocked at each end by a $H_d L_e SiO_{(4-(d+e))/2}$ unit, where d+e is equal to 3.

7. The composition of claim 1, wherein the ratio of the number of hydrogen atoms linked to silicon in the polyorganosiloxane crosslinking agent (B) to the total number of groups with an alkenyl unsaturation of the polyorganosiloxane (A) and of the gum (A') is less than 1.

8. The composition of claim 1, wherein the alkenyl group or groups of the gum (A') are distributed on the organopolysiloxane chain of said gum with the exception of the ends.

9. The composition of claim 1, wherein the alkenyl group or groups of the gum (A') are disposed solely at the ends of the organopolysiloxane chain of said gum.

10. The composition of claim 1, wherein the gum (A') is present in an amount of 5 to 20% by weight based on all the constituents.

11. The composition of claim 1, wherein the reinforcing filler (D) is a silica or an alumina.

12. A method for adhesively bonding at least two substrates S1 and S2, consisting essentially of:
preparing an adhesive composition of claim 1;
applying said composition of claim 1 to at least one of the surfaces of S1 and/or S2 to be adhesively bonded to form at least one adhesively coated surface; and
assembling the adhesive-coated surfaces together.

13. The method as claimed in claim 12, wherein the substrates S1 and S2 are two parts constituting an inflatable bag for the protection of an occupant of a vehicle, to be assembled by inserting stitches by sewing, the composition being applied on at least one of the surfaces of S1 and/or S2 in the region of the stitching.

14. The method as claimed in claim 13, wherein the step of heating said composition is performed before stitching the substrates S1 and S2.

15. A method of adhesively bonding at least two substrates, said method comprising applying the crosslinkable silicone composition of claim 1.

16. A method of providing a leak-proof joint between two substrates assembled by sewing, said method comprising applying the crosslinkable silicone composition of claim 1.

17. An inflatable bag for protecting an occupant of a vehicle, consisting of two parts sewn together, adhesively bonded and/or made leakproof in the region of the stitching by a composition as described in claim 1.

18. The composition of claim 1, where said at least two alkenyl groups in said at least one polyorganosiloxane (POS A) are C2-C6 groups linked to silicon.

19. The composition of claim 1, where the at least one metallic compound in said catalyst is platinum.

20. The composition of claim 1 wherein said alkenyl group or groups in said POS (A') are C2-C6 groups linked to silicon.

21. The composition of claim 1, wherein said alkenyl group or groups in said POS (A') are vinyl groups.

22. The composition of claim 1, where said content by weight of alkenyl group or groups in POS (A') is between 0.01% and 0.1%.

23. The composition of claim 1, where POS (A') has a consistency of between 500 and 1000 at 25° C.

24. The composition of claim 1, where POS (A') has a consistency of between 600 and 900 at 25° C.

25. A method for adhesively bonding at least two substrates S1 and S2, consisting essentially of:
preparing an adhesive composition of claim 1;
applying said composition of claim 1 to at least one of the surfaces of S1 and/or S2 to be adhesively bonded to form at least one adhesively coated surface;
assembling the adhesive-coated surfaces together to form an assembly; and
at least one of:
exerting pressure on the adhesive-coated surfaces; and
heating said assembly.

* * * * *